(12) United States Patent
Pawar et al.

(10) Patent No.: US 9,253,705 B1
(45) Date of Patent: Feb. 2, 2016

(54) RESOLVING HANDOVER IN PRESENCE OF COVERAGE AREA IDENTIFIER CONFLICT

(71) Applicants: Sprint Spectrum L.P., Overland Park, KS (US); Clearwire IP Holdings LLC, Overland Park, KS (US)

(72) Inventors: Hemanth B. Pawar, Brambleton, VA (US); Shilpa Kowdley Srivinas, Brambleton, VA (US); Krishna Sitaram, Chantilly, VA (US); Daniel Vivanco, Sterling, VA (US); Chunmei Liu, Great Falls, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 75 days.

(21) Appl. No.: 14/175,027

(22) Filed: Feb. 7, 2014

(51) Int. Cl.
*H04W 36/00* (2009.01)
*H04W 36/32* (2009.01)

(52) U.S. Cl.
CPC .................................... *H04W 36/32* (2013.01)

(58) Field of Classification Search
USPC .............. 455/432.1, 433, 436, 437–439, 440, 455/442, 452.2, 453, 456.1; 370/331–333
See application file for complete search history.

(56) References Cited

U.S. PATENT DOCUMENTS

| | | | | |
|---|---|---|---|---|
| 8,194,560 | B2* | 6/2012 | Ji | H04W 8/26 370/252 |
| 8,743,858 | B2* | 6/2014 | Tinnakornsrisuphap | H04W 8/26 370/329 |
| 2010/0067514 | A1* | 3/2010 | Luo | H04L 23/02 370/342 |
| 2010/0240358 | A1* | 9/2010 | Jen | H04W 36/385 455/424 |
| 2010/0297955 | A1 | 11/2010 | Marinier et al. | |
| 2012/0142356 | A1* | 6/2012 | Serravalle | H04W 36/0016 455/436 |
| 2013/0137434 | A1* | 5/2013 | Godin | H04W 8/24 455/436 |
| 2013/0244718 | A1* | 9/2013 | Lee | H04W 36/0083 455/525 |
| 2015/0140993 | A1* | 5/2015 | Horn | H04W 8/26 455/418 |

* cited by examiner

*Primary Examiner* — Dai A Phuong

(57) ABSTRACT

A method and system for resolving handover in the presence of coverage area identifier conflict is disclosed. In a market area in which an LTE RAN and CDMA RAN operate, a base station receives a PCI that indicates a particular one of the LTE coverage areas detected by a mobile terminal. The base station determines that at least two of the LTE coverage areas have the particular PCI. Thereafter, the base station determines which one of the LTE coverage areas is the particular LTE coverage area that was indicated by the particular PCI based at least in part on a particular PN offset that indicates a particular CDMA coverage area of the CDMA RAN. The base station then arranges for handover to the particular LTE coverage area.

18 Claims, 4 Drawing Sheets

RESOLVING HANDOVER IN PRESENCE OF COVERAGE AREA IDENTIFIER CONFLICT

BACKGROUND

Unless otherwise indicated herein, the materials described in this section are not prior art to the claims and are not admitted to be prior art by inclusion in this section.

From time to time, a wireless service provider may build-out a new radio access network (RAN). A new RAN may allow the wireless service provider to provide wireless service in a new market area. Or, the new RAN may allow the wireless service provider to take advantage of a new radio access technology in a market area with an established RAN. For example, a wireless service provider may build out an LTE (Long-Term Evolution) RAN alongside an established CDMA (Code Division Multiple Access) RAN to take advantage of LTE technology.

Build-out of a RAN may involve installation of base stations at various cell sites within a market area. Each base station may be configured to radiate and thereby define one or more coverage areas in which to serve mobile terminals according to a radio access technology. Further, each base station may be coupled with network infrastructure that provides connectivity with one or more transport networks, such as the public switched telephone network (PSTN) and/or the Internet for instance. With this arrangement, a mobile terminal within coverage of the RAN may engage in air interface communication with a base station and may thereby communicate via the base station with various remote network entities or with other mobile terminals served by the base station or by other base stations.

As each new base station is added to the RAN, an identifier is assigned to each coverage area provided by the RAN to differentiate the respective coverage area from other coverage areas within the RAN. In operation, a base station may provide the assigned identifiers of its coverage areas to nearby mobile terminals and base stations within range of air-interface communication by broadcasting its assigned identifiers over an air-interface. Upon receiving a broadcasted identifier, nearby mobile terminals may reference the broadcasted identifier in an attachment or handover request. Other operations are possible as well.

Typically, each radio access technology has an identifier of a different type. For example, CDMA has one type of identifier known as a pseudo-noise (PN) offset while LTE has a different type of identifier known as a Physical Cell ID (PCI). Moreover, each type generally has a limited number of unique identifiers available. For example, there are 512 unique PN offsets to identify assign to coverage areas in a CDMA RAN. In practice, it is common to re-use identifiers within the RAN because of the limited number of unique identifiers available.

Operations such as attachment and handover may be disrupted by an issue known as identifier conflict. Identifier conflict may occur when two or more coverage areas are assigned the same identifier. Assigning the same identifier to coverage areas creates ambiguity among the coverage areas that may cause confusion within the RAN. For example, when a mobile terminal requests handover to a target coverage area that is involved in an identifier conflict, the identifier of the target coverage area represents two or more possible target coverage areas. Since the two or more possible target coverage areas have the same identifier, a base station receiving the handover request may not be able determine which of the two or more possible target coverage areas is the target coverage area and may thereby be unable to successfully resolve the handover.

In practice, assigning identifiers to coverage areas in a manner that geographically isolates coverage areas having the same identifier from one another avoids identifier conflict. However, due to human and computer error in assigning identifiers, identifier conflict remains a recurring problem. Generally, wireless service providers attempt to minimize the occurrence of these issues because an identifier conflict may cause a user to experience dropped calls and other disadvantages.

OVERVIEW

A technique to resolve handover of a mobile terminal in the presence of identifier conflict is desirable. Such a technique has the potential to reduce the number of dropped calls and other issues caused by identifier conflict. As noted above, identifier conflict creates ambiguity between two or more coverage areas of a RAN. Accordingly, resolving handover may depend upon disambiguating between two or more possible coverage areas to identify a particular coverage area as the target coverage area. One technique for disambiguating is to identify the target coverage area using a global identifier that can uniquely identify a coverage area across the entire world. For example, LTE has a global identifier known as a enhance cell global identity (ECGI). An ECGI of an LTE coverage area uniquely identifies the LTE coverage area among all LTE coverage areas in the whole world. However, identification using global identifiers involves significant communications overhead and other disadvantages.

Disclosed herein is a method and system to arrange for handover of a mobile terminal to a coverage area in a first RAN using an identifier of a type associated with a second RAN. The method and system is particularly useful to resolve handover where identifier conflict exists. Specifically, when identifier conflict creates ambiguity between two or more first coverage areas, the first RAN may disambiguate between two or more first coverage areas by using an identifier of a type associated with a second RAN. Once the ambiguity is removed, the first RAN may resolve the handover. In addition to handover, the disclosed method and system can apply in other scenarios as well. For example, this method and system may assist in attachment of a mobile terminal to a coverage area that has a conflicting identifier.

In practice, a wireless service provider may operate more than one RAN in a given market area. As noted above, when a new radio access technology becomes available, a wireless service provider may build a new RAN alongside of one or more established RANs to take advantage of the new radio access technology. To reduce infrastructure costs associated with the new RAN, the new RAN may utilize the infrastructure of the original RAN. For example, base stations of the new RAN may be co-located with base stations of the original RAN at the same cell sites.

In accordance with the disclosure, a market area may include a first RAN and a second RAN, where the first RAN has first base stations that radiate to provide first coverage areas and the second RAN has second base stations that radiate to provide second coverage areas. Each first coverage area of the first RAN may have an identifier of a first type and each second coverage area of the second RAN may have an identifier of a second type.

Within the above arrangement, the first RAN may provide wireless service to a mobile terminal. While receiving service, the mobile terminal may detect nearby first coverage areas of the first RAN. Further, from time to time, the mobile terminal may send, to a base station, a handover request that indicates a target coverage area detected by the mobile terminal. The handover request may specify the target coverage area using a particular identifier. The handover request may also specify additional detected first coverage areas by their respective identifiers. Upon receiving the handover request specifying the particular identifier, the base station may reference a neighbor list of nearby first coverage areas in range of air-interface communication. Generally, the base station may find a particular coverage area having a matching identifier to the particular identifier in the handover request and then orchestrate handover to the particular coverage area (i.e. the target coverage area).

Occasionally, however, the handover request may specify a target coverage area via a particular identifier that indicates two or more possible coverage areas of the first RAN because of identifier conflict. In such a circumstance, upon receiving the handover request, the first RAN may detect the identifier conflict by determining that at least two of the first coverage areas have the particular one of the identifiers of the first type. In response, the first RAN may request the mobile terminal to detect second coverage areas within the second RAN and send to the first RAN a particular identifier of the second type to indicate a particular second coverage area detected by the mobile terminal.

Upon receiving the requested particular identifier of the second type, the first RAN may use the received identifier of the second type to disambiguate between the two or more possible coverage areas of the first RAN indicated by the particular identifier. For instance, the first RAN may maintain correlation data that maps first coverage areas to identifiers of second coverage areas, with each mapping possibly being based upon co-location of a first coverage area with a respective second coverage area at a cell site. Using such correlation data, the first RAN may determine which first coverage area is mapped to the received identifier and thereby determine which first coverage area is the target coverage area. Since there is no longer ambiguity between the two or more possible coverage areas because the target coverage area is known, the first RAN may then arrange to handover the mobile terminal to the target coverage area.

Accordingly, in one respect, disclosed is a method operable by a base station in a system including a first RAN and a second RAN. The first RAN has first base stations that radiate to provide first coverage areas and each first coverage area of the first RAN has an identifier of a first type. The second RAN has second base stations that radiate to provide second coverage areas and each second coverage area of the second RAN has an identifier of the second type that is different from the first type. By way of example, the first RAN may be an LTE RAN, the identifiers of the first type may be a PCI, the second RAN may be a CDMA RAN, and the identifiers of the second type may be PN offsets.

The method may involve receiving into a particular one of the first base stations of the first RAN, wirelessly from a mobile terminal, (i) a handover request that specifies a particular one of the identifiers of the first type as an indication of a particular one of the first coverage areas detected by the mobile terminal and (ii) a specification of a particular one of the identifiers of the second type as an indication of a particular one of the second coverage areas detected by the mobile terminal. Based at least in part on the received specification of the particular identifier of the second type, the method may further involve determining by the particular first base station which one of the first coverage areas is the particular first coverage area that was indicated by the particular identifier of the first type in the handover request. Based on the determining, the method may then involve arranging for handover of the mobile terminal to the determined coverage area.

In another respect, disclosed is a method operable in a system comprising a first radio access network (RAN) and a second RAN. The first RAN has first base stations that radiate to provide first coverage areas and each first coverage area of the first RAN has an identifier of a first type. Whereas, the second RAN has second base stations that radiate to provide second coverage areas and each second coverage area of the second RAN has an identifier of the second type that is different from the first type.

The method may involve receiving into a particular one of the first base stations of the first RAN (i) a specification of a particular one of the identifiers of the first type as an indication of a particular one of the first coverage areas detected by a mobile terminal and (ii) a specification of a particular one of the identifiers of the second type as an indication of a particular one of the second coverage areas detected by the mobile terminal. The method may further involve determining that at least two of the first coverage areas have the particular one of the identifiers of the first type. In response to determining that at least two of the first coverage areas have the particular one of the identifiers of the first type, the method may further involve determining which one of the first coverage areas is the particular first coverage area that was indicated by the particular identifier of the first type, where determining which one of the first coverage areas is the particular first coverage area is based at least in part on the received specification of the particular identifier of the second type. The method may further involve serving the mobile terminal based on the determining which one of the first coverage areas is the particular first coverage area that was indicated by the particular identifier of the first type.

And still in another respect, disclosed is an eNodeB of an LTE RAN operable in a system including a LTE RAN and a CDMA RAN. The LTE RAN has evolved Node Bs (eNodeB) that radiate to provide LTE coverage areas, where each LTE coverage area of the LTE RAN is identified by a PCI. The CDMA RAN has base stations that radiate to provide CDMA coverage areas, where each CDMA coverage area of the CDMA RAN is identified by a PN offset.

The eNodeB may include an antenna structure and a controller. The antenna structure may be configured to communicate over an air interface with mobile terminals and a controller. The controller may be configured to receive, via the antenna structure from a mobile terminal, (i) a handover request that specifies a particular PCI as an indication of a particular one of the LTE coverage areas detected by the mobile terminal and (ii) a specification of a particular PN offset as an indication of a particular one of the CDMA coverage areas detected by the mobile terminal. The controller may be further configured to determine which one of the LTE coverage areas is the particular LTE coverage area that was indicated by the particular PCI in the handover request, wherein the determination is based at least in part on the received specification of the particular PN offset. The controller may be further configured to arrange for handover of the mobile terminal to the determined LTE coverage area based on the determining which one of the LTE coverage areas is the particular LTE coverage area that was indicated by the particular PCI in the handover request.

These as well as other aspects, advantages, and alternatives will become apparent to those of ordinary skill in the art by reading the following detailed description, with reference where appropriate to the accompanying drawings. Further, it should be understood that the description provided in this overview section and elsewhere in this document is provided by way of example only.

DETAILED DESCRIPTION

Figure 1:
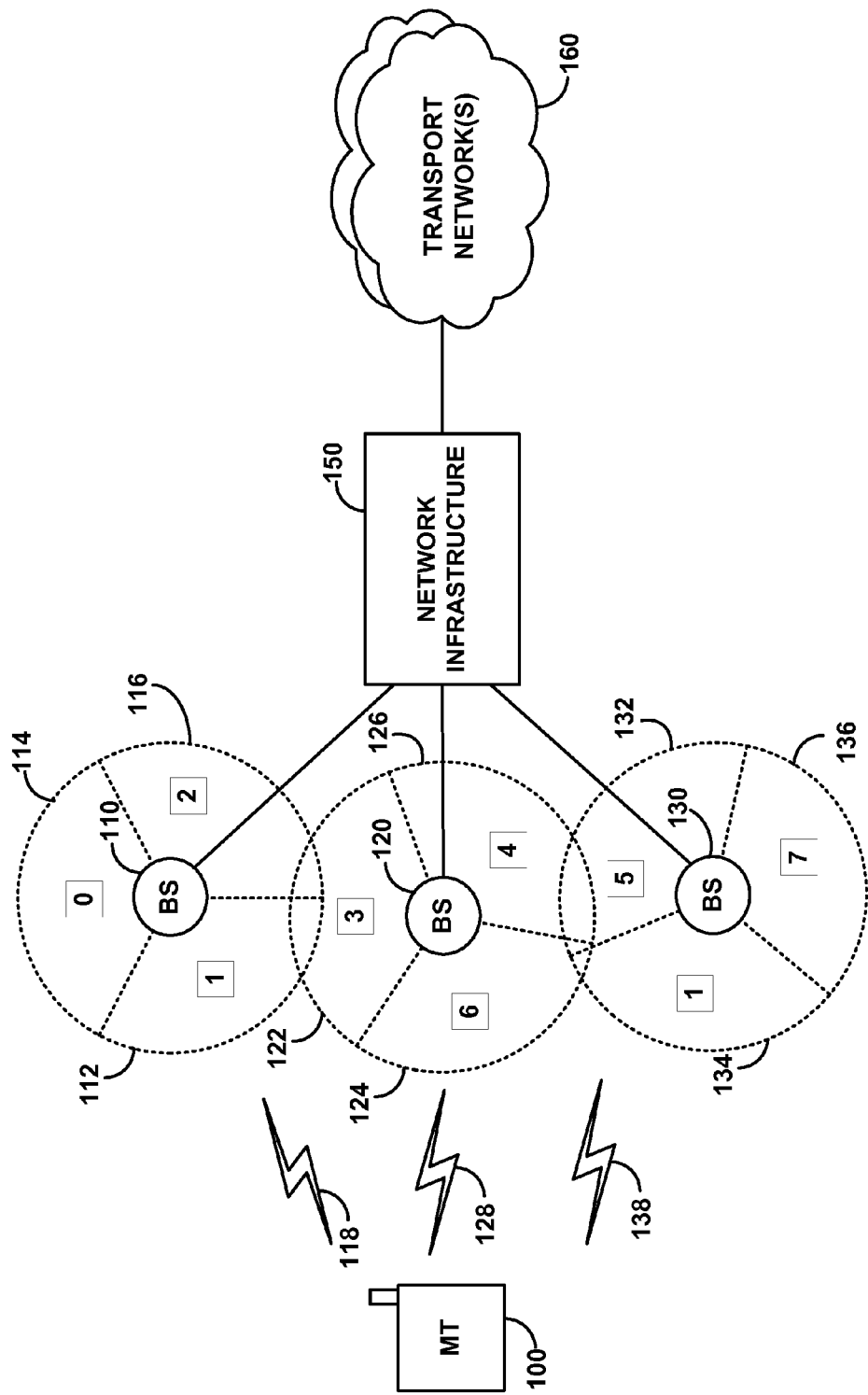
FIG. 1 is a simplified block diagram of an example communication system.

Referring to the drawings, as noted above, FIG. 1 is a simplified block diagram of an example communication system. In FIG. 1, each base station is shown radiating to define one or more coverage areas each of which may operate on a particular frequency band for instance. In particular, base station 110 is shown radiating to define coverage areas 112, 114, and 116, base station 120 is shown radiating to define coverage areas 122, 124, and 126, and base station 130 is shown radiating to define coverage areas 132, 134, and 136. The coverage areas in FIG. 1 are arranged as sectors, as shown.

The illustrated communication system may operate in accordance with a particular radio access technology such as CDMA and LTE, as noted above. By way of example, the system may be an LTE RAN, in which case each base station may be an LTE eNodeB, and the supporting network infrastructure may include elements such as a mobility management entity (MME), serving gateway (SGW) and a packet data network gateway (PGW). As another example, the system may be a CDMA RAN, in which case each base station may be a CDMA base station known as a base transceiver station (BTS), and the supporting network infrastructure may include elements such as a base station controller (BSC), radio network controller (RNC), mobile switching center (MSC), and packet data serving node (PDSN). Other examples are possible as well.

FIG. 1 further depicts an example mobile terminal 100 positioned in range of air-interface communication with base station 110, base station 120, and base station 130. Mobile terminal 100 may receive wireless service from one of base station 110, 120, or 130 and may thereby communicate with various remote network entities or with other mobile terminals via network infrastructure 150 and perhaps via one or more transport networks 160.

In operation, each coverage area in the example communication system may radiate to define an air-interface. The air-interface may include a downlink or forward link for carrying communications from the serving base station to served mobile terminals, and an uplink or reverse link for carrying communications from served mobile terminals to the serving base station. In one instance, FIG. 1 shows air interfaces 118, 128, and 138 of coverage areas 112, 124, and 134, respectively. Each of air interface 118, 128, and 138 may include a downlink and an uplink for communicating with mobile terminal 100. Depending on the radio access technology, these air interface links may take various forms and may define various channels for carrying particular data, such as control data and bearer traffic for instance.

By way of example, each coverage area may define a pilot channel or reference channel on which the base station may broadcast a pilot signal or reference signal that mobile terminals may detect as an indication of coverage and may measure to determine coverage strength. Further, each coverage area may define a control channel that carries various overhead messages, such as system information blocks or the like, specifying characteristics and operational parameters of the coverage area.

Each coverage area may also have a respective coverage area identifier, such as a PCI or a PN offset. In FIG. 1, for instance, coverage areas 112, 114, and 116 provided by base station 110 have identifiers 1, 0, and 2, respectively. Coverage areas 122, 124, and 126 provided by base station 120 have identifiers 3, 6, and 4, respectively. Coverage areas 132, 134, and 136 have identifiers 5, 1, and 7, respectively. Each coverage area identifier may be indicated to mobile terminals and other base stations by the pilot or reference signal or specified in another overhead broadcast message or signal. Typically, the wireless service provider assigns each coverage area identifier when the coverage area is installed. The wireless service provider may re-assign coverage area identifiers on occasion, such as when additional coverage areas are added to the network.

Each base station may maintain a neighbor list of nearby coverage areas. The base station may refer to the neighbor list when communicating with the neighboring base stations. To populate its neighbor list, a base station may detect one or more indications of coverage from nearby base stations. As noted above, a base station may indicate each of its coverage areas via a respective pilot or reference signal. Within the neighbor list, coverage areas may be identified by their respective coverage area identifier. Further, for each neighboring coverage area in the neighbor list, the neighbor list may include an address, such as an IP address, for the base station that is providing the neighboring coverage area. Each address may be used to reference a particular base station when communicating with that base station.

When a mobile terminal first powers on or enters into coverage of the network, the mobile terminal may scan for pilot or reference signals and determine for each detected signal a signal level (e.g., receive strength or signal-to-noise ratio) and corresponding coverage area identifier. The mobile terminal may thereby determine a coverage area providing the strongest pilot or reference signal and may engage in a process to register with the network by transmitting an attach request (registration request) to the base station that is providing that signal. In one instance, mobile terminal 100 may identify coverage area 124 as providing the strongest pilot or reference signal and may then transmit an attach request to base station 120 that specifies coverage area 124 via its identifier.

At the time of attachment or thereafter, a mobile terminal may also engage in signaling with the base station to enter into a connected mode. In the connected mode, the base station has provisioned for use by the mobile terminal a radio link connection over which the mobile terminal can engage in bearer communication with the base station and thereby with various other entities. In that mode, for instance, the mobile terminal may engage in packet data communications on the Internet and/or a voice call on the PSTN. This configuration may be referred to as the mobile terminal receiving wireless service from the base station.

While in the connected mode, the mobile terminal may then continue to regularly scan pilot or reference signals, from both the coverage area serving the mobile terminal and from various other coverage areas. Alternatively or additionally, the base station may direct the mobile terminal to engage in such scanning from time to time. As the mobile terminal carries out this scanning, the mobile terminal may thus again determine the signal level of various coverage areas, and the identities of those coverage areas. To illustrate, while connected to coverage area 134, mobile terminal 100 may determine the signal level of coverage areas 112 and 124, among others.

Further, the mobile terminal may from time to time in the connected mode transmit to its serving base station a measurement report that specifies the signal level of each coverage area detected by the mobile terminal. In particular, the measurement report may specify each detected coverage area (e.g., by coverage area identifier) and the signal level (e.g., reference signal receive strength, or signal-to-noise ratio) of the coverage area as determined by the mobile terminal. In practice, a given measurement report may thus include such information for the mobile terminal's currently serving coverage area and may also include such information for each of one or more other coverage areas detected by the mobile terminal.

When the serving base station receives such a measurement report from the mobile terminal, if the measurement report specifies signal level of another coverage area, the base station or other network node may engage in a process to decide whether to trigger handover of the mobile terminal to the other coverage area (known as the target). In general, this process may involve evaluating the reported signal level of the other coverage area to determine whether it is sufficiently strong itself and/or whether it is sufficiently stronger than the reported signal level of the serving coverage area. Further, the process may involve consideration of other factors as well, such as load and backhaul capacity for instance.

If the serving base station decides to trigger handover of the mobile terminal to a target coverage area of another base station, the serving base station may then reference its neighbor list of nearby coverage areas. The serving base station may then find a particular coverage area having a matching identifier to the target coverage area in the neighbor list. Next, the serving base station may transmit to that other base station, either over a direct inter-base-station interface or through the one or more other network entities, a handover request message that requests the other base station to provide service to the mobile terminal via the target coverage area. The handover request message may specify the target coverage area using the coverage area identifier of the target. The other base station may then engage in a handover preparation process to establish a radio link for the mobile terminal, and the mobile terminal may then ultimately transition to be served instead by that other base station.

Identifier conflict may interfere with the operations described above. As noted above, identifier conflict may occur when neighboring coverage areas are assigned the same identifier. To illustrate, consider an arrangement in which mobile terminal 100 is receiving wireless service from coverage area 124 provided by base station 120. Occasionally, mobile terminal 100 may transmit a measurement report to serving base station 120. The measurement report may specify coverage areas detected by mobile terminal 100. For example, if mobile terminal 100 detects coverage area 112, a measurement report transmitted by mobile terminal 100 may include the identifier of coverage areas 112. However, the identifiers of coverage areas 112 and 134 are conflicting because each coverage area is identified by identifier 1, as shown. Moreover, the neighbor list of base station 120 may include two entries for coverage area identifier "1" because base station 110 and base station 130 have both indicated coverage area identifier "1" via a pilot or reference signal.

Therefore, when base station 120 receives the measurement report, confusion may result because the conflicting identifiers create ambiguity between coverage areas 112 and 134. For example, if base station 120 decides to trigger handover to one of coverage areas 112 or 114, base station 120 may then refer to its neighbor list and find two entries indicating coverage area identifier "1." Base station 120 may be then unable to determine whether to send a handover request message to base station 110 or to base station 130. Or, base station 120 may send a handover request message to base station 130 to reserve resources of coverage area 134 when mobile terminal 100 intended coverage area 112. In that case, a handover of mobile terminal 100 to base station 110 may fail because base station 110 may not have resources reserved for mobile terminal 100.

Further, through this process, base station 130 may have unnecessarily reserved resources that are unused because mobile terminal 100 will not transfer to base station 130. Such resources may include, for example, a radio link connection. Unnecessarily reserving resources is inefficient. For example, where an identifier conflict has caused a base station to unnecessarily reserve radio link connections, an incoming handover request to the base station may fail for lack of a radio link connection to allocate to the mobile terminal that has requested handover. Identifier conflict may cause other issues within the communication system as well.

Figure 2:
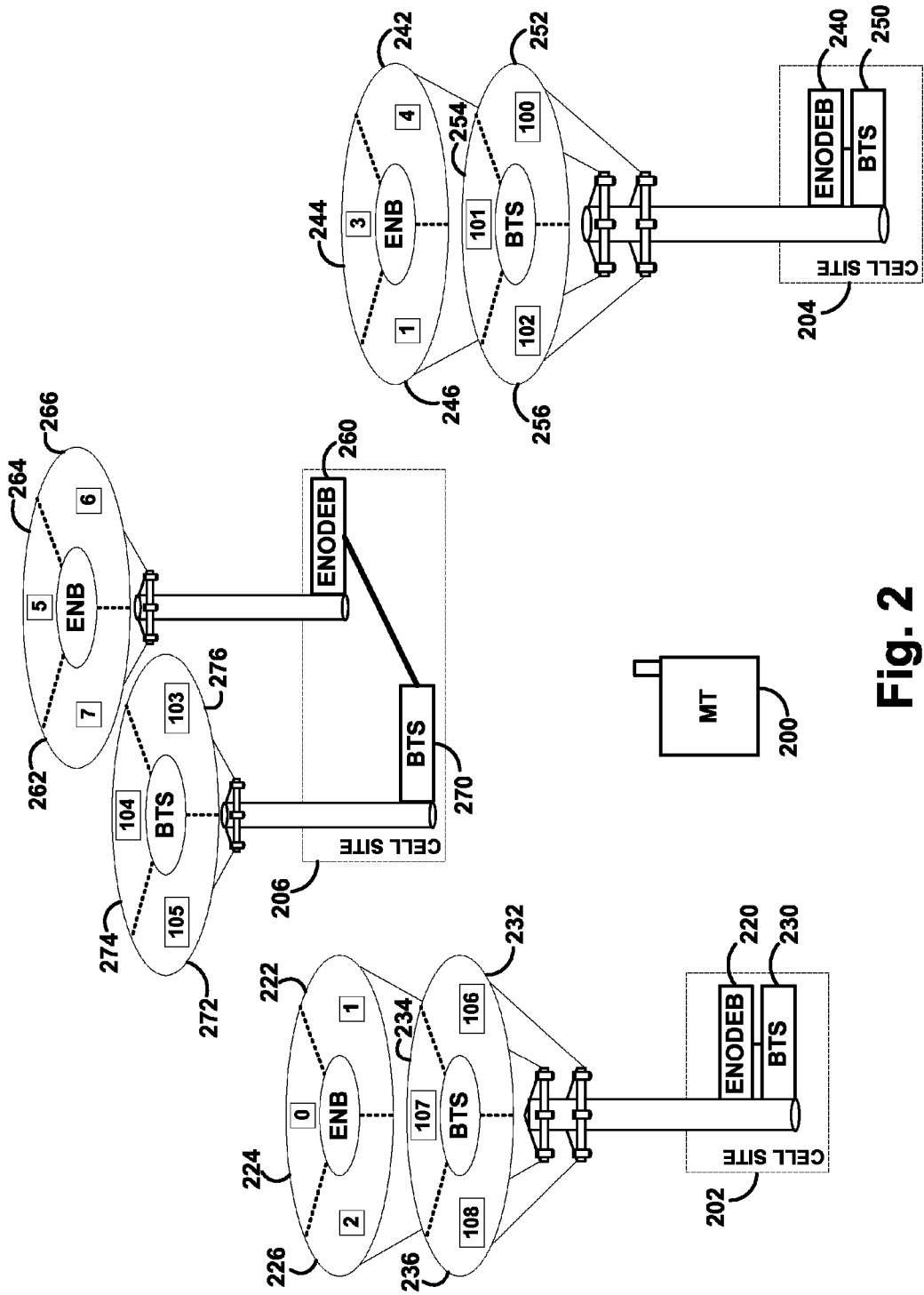
FIG. 2 is a simplified block diagram of an example communications system in which the present method can be implemented.

FIG. 2 is a simplified block diagram of an example communications system in which the present method can be implemented. The example communications system may provide wireless service within a market area. Within the example communications system, components of both an LTE RAN and a CDMA RAN are shown. While an LTE RAN and a CDMA RAN are shown for the purpose of example and explanation, the present method may be implemented using any two RANs. For example, the present method may be implemented in a market area in which a wireless service provider operates an LTE RAN and a GSM RAN. Moreover, the present method may be implemented using a RAN that operates according to one or more other radio access technologies that have yet to be developed.

In operation, each coverage area in the example communication system may radiate to define an air-interface. The air-interface may include a downlink or forward link for carrying communications from the serving base station to served mobile terminals, and an uplink or reverse link for carrying communications from served mobile terminals to the serving base station. In one instance, FIG. 1 shows air interfaces 118, 128, and 138 of coverage areas 112, 124, and 134, respectively. Each of air interfaces 118, 128, and 138 may include a downlink and an uplink for communicating with mobile terminal 100. Depending on the radio access technology, these air interface links may take various forms and may define various channels for carrying particular data, such as control data and bearer traffic for instance.

As shown in FIG. 2, the LTE RAN includes at least eNodeB 220, 240, and 260. ENodeB 220 radiates to provide LTE coverage areas 222, 224, and 226, eNodeB 240 radiates to provide LTE coverage areas 242, 244, and 246, and eNodeB 260 radiates to provide LTE coverage areas 262, 264, and 266. Further, the LTE RAN may include additional components not shown such as the network infrastructure shown in FIG. 1.

The CDMA RAN includes at least base transceiver stations (BTS) 230, 250, and 270. BTS 230 radiates to provide CDMA coverage areas 232, 234, and 236, BTS 250 radiates to provide CDMA coverage areas 252, 254, and 256, and BTS 270 radiates to provide CDMA coverage areas 272, 274, and 276. Further, the CDMA RAN may include additional components not shown.

Mobile terminal 200 may operate in the market area. To receive wireless service, mobile terminal 200 may engage in air-interface communication with one or more of eNodeB 220, 240, and 260 of the LTE RAN. Mobile terminal 200 may also engage in air-interface communication with one or more of BTS 230, 250, and 270 of the CDMA RAN. Air-interface communication with components of the LTE RAN may occur concurrently with air-interface communication with components of the CDMA RAN, or may occur separately.

Components of a communications system may be co-located and/or integrated together in various ways. For example, as a wireless service provider builds out an LTE RAN in the same market area as a CDMA RAN, LTE eNodeBs may be co-located with CDMA BTSs. For instance, in FIG. 2, eNodeBs of the LTE RAN are shown co-located with BTSs of the CDMA RAN at cell sites. Particularly, eNodeB 220 and BTS 230 are co-located at cell site 202 and share the same tower structure, as shown. ENodeB 240 and BTS 250 are co-located at cell site 204 and also share the same tower structure. ENodeB 260 and BTS 270 are co-located at cell site 204 and are shown having separate tower structures. Further, pairs of co-located base stations, such as eNodeB 220 and BTS 230, may share additional infrastructure, such as network infrastructure 150 as shown in FIG. 1.

Figure 3:
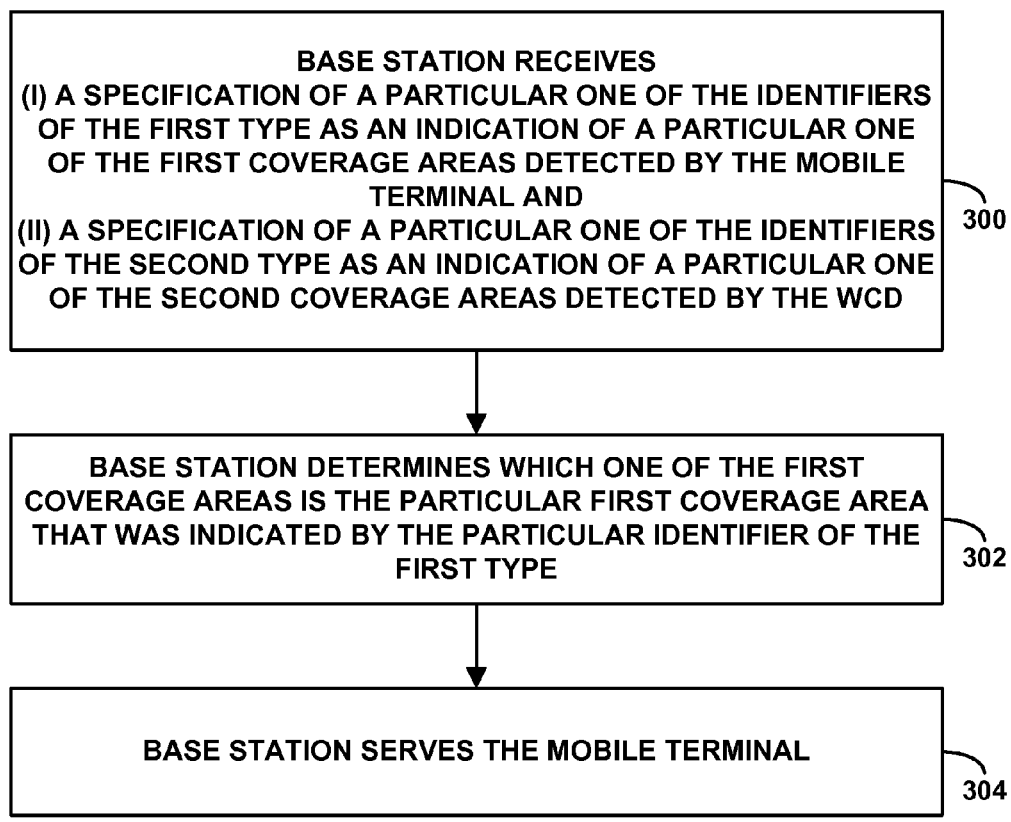
FIG. 3 is a flow chart depicting example functions that can be carried out in accordance with the method.

As noted above, the present method may assist in serving mobile terminals in the presence of identifier conflict by disambiguating between two or more coverage areas that have the same identifier. FIG. 3 is a flow chart depicting example functions that may be carried out in a system that includes a first RAN and a second RAN, such as the system described in FIG. 2. The first RAN may have first base stations that radiate to provide first coverage areas and each first coverage area of the first RAN may have an identifier of a first type. Whereas, the second RAN may have second base stations that radiate to provide second coverage areas and each second coverage area of the second RAN may have an identifier of the second type that is different from the first type. A particular one of the base stations of the first RAN may carry out the functions.

As shown in FIG. 3, at block 300, the base station receives (i) a specification of a particular one of the identifiers of the first type as an indication of a particular one of the first coverage areas detected by the mobile terminal and (ii) a specification of a particular one of the identifiers of the second type as an indication of a particular one of the second coverage areas detected by the mobile terminal. At block 302, the base station determines which one of the first coverage areas is the particular first coverage area that was indicated by the particular identifier of the first type. The determination may be based at least in part on the received specification of the particular identifier of the second type. And, at block 304, the base station serves the mobile terminal based on the determination of which one of the first coverage areas is the particular first coverage area that was indicated by the particular identifier of the first type.

The base station may receive the specification of a particular one of the identifiers of the first type in various types of messages, such as in handover request or in a measurement report. For instance, an eNodeB may receive, wirelessly from a mobile terminal, a handover request that specifies a particular PCI as an indication of a particular LTE coverage area detected by the mobile terminal. In one example, the handover request may be a part of a measurement report containing indications of reference signals of coverage areas of the first RAN. In such an example, the particular PCI may be a particular one of several PCIs that each indicate a first coverage area detected by the mobile terminal. In other implementations of the method, the base station may receive the specification of a particular one of the identifiers of the first type in another form or from another entity, such as in a message from a base station. For instance, the base station may receive a message that indicates neighboring coverage areas of another base station where each neighboring coverage area is identified by a coverage area identifier.

Upon receiving the specification of a particular one of the identifiers of the first type, the base station may determine that at least two of the first coverage areas have the particular one of the identifiers of the first type. This circumstance may indicate that an identifier conflict exists among the identifiers of the at least two first coverage areas. Determining that at least two of the first coverage areas have the particular one of the identifiers of the first type may involve referring to a neighbor list of nearby first coverage areas. As noted above, for instance, when resolving a handover request, the base station may look-up the particular one of the identifiers of the first type in the neighbor list. In the process of looking up the particular one of identifiers of the first type, the base station may find that two or more entries in the neighbor list reference the particular one of the identifiers of the first type and thereby determine that at least two of the first coverage areas have the particular one of the identifiers of the first type.

In response to determining that at least two of the first coverage areas have the particular one of the identifiers of the first type, the base station may request and receive from the mobile terminal the specification of the particular identifier of the second type. For instance, the base station may request the mobile terminal to send a report of air-interface quality of the second RAN. The report of air-interface quality of the second RAN may be a measurement report of pilot signal strengths of coverage areas of the second RAN where each coverage area in the measurement report is indicated by a coverage area identifier. In such an example, the particular identifier of the second type may be a particular one of the coverage area identifiers that indicate coverage areas of the second RAN. The mobile terminal may send this report to the base station.

As noted above, at block 302, the base station may use the received specification of the particular identifier of the second type to determine which one of the first coverage areas is the particular first coverage area that was indicated by the particular identifier of the first type. The base station may use the received specification of the particular identifier of the second type to make this determination, on grounds that the particular identifier of the second type is likely to be for a second coverage area that is co-located with or otherwise geographically correlated with the intended first coverage area.

The theory here is that certain second coverage areas (of the second RAN) are likely to be co-located with or otherwise geographically correlated with certain first coverage areas (of the first RAN), particularly if the first RAN is built out as an overlay using base stations or cell sites already in place for the second RAN, and even further if the two RANs use the same frequencies (having similar radio frequency propagation). In such a scenario, the strongest first coverage area that the mobile terminal detects and reports to the base station as having the particular identifier of the first type may be co-located with or otherwise geographically correlated with the strongest second coverage area that the mobile terminal detects and reports to the base station as having the particular identifier of the second type. Thus, provided with the mobile terminal's report of the strongest such detected second coverage area, the base station may map the reported identifier of that second coverage area to the intended first coverage area.

To facilitate applying this mapping, the base station may be provisioned with correlation data that specifies for each of various identifiers of the second type (of the second RAN) a respective first coverage area (of the first RAN). Thus, given the mobile terminal's report of a detected particular identifier of the second type (optimally the strongest one detected by the mobile terminal at its currently location), the base station may refer to the correlation data to determine which first coverage area corresponds, and may conclude that the particular identifier of the first type as reported by the mobile terminal represents that determined first coverage area.

Within the correlation data, each mapping may be based on geographic correlation of a base station that provides a first coverage area with a base station that provides a respective second coverage area as noted above. Such geographic correlation may be co-location of the base stations of each RAN at a cell site. For instance, coverage area 226 may be mapped to identifier "108" of coverage area 236 based on co-location, at cell site 202, of eNodeB 220 (providing coverage area 226) and BTS 230 (providing coverage area 236). Or, as another example, coverage area 264 may be mapped to identifier "104" of coverage area 274 based on co-location, at cell site 206, of eNodeB 260 (providing coverage area 264) and BTS 270 (providing coverage area 274). The mappings may also be based, in part, on the relative arrangement of first coverage areas and second coverage areas. For instance, if a particular first coverage area is orientated to radiate in a particular direction and a particular second coverage area is orientated to radiate in the same particular direction, the particular first coverage area may be mapped to the identifier of the particular second coverage area.

Further, the correlation data in the data storage may map each first coverage area to a respective identifier of a coverage area of the second RAN by mapping a distinguishing identifier of each first coverage area to a respective identifier of a coverage area of the second RAN. The distinguishing identifier may identify each first coverage area uniquely across the first RAN. Or, the distinguishing identifier may identify each first coverage area uniquely across a portion of the first RAN where the portion includes the at least two first coverage areas having the particular one of the identifiers of the first type. For instance, the distinguishing identifier may be a network identifier such as an IP address or a MAC address. Alternatively, the distinguishing identifier may be an identifier related to a particular radio access technology used by the first RAN.

The base station may maintain the correlation data in a data storage. Further, from time to time, such as when an identifier of a coverage area in the second RAN is re-assigned, the base station may receive new or additional correlation data to update the correlation data maintained in the data storage with one or more new mappings. In one instance, the correlation data may include a mapping for a subset of first coverage areas of the first RAN, such as the first coverage areas within the neighbor list. Alternatively, the correlation data may include a mapping for all of the first coverage areas of the first RAN.

As noted above, at block 304, the base station serves the mobile terminal. Serving the mobile terminal may involve the base station arranging for handover of mobile terminal to the determined coverage area. Such an implementation may be useful when the base station receives the specification of a particular one of the identifiers of the first type in a handover request from a mobile terminal and, accordingly, the base station attempts to resolve the received handover request.

As noted above, in one example, the correlation data may map a distinguishing identifier of each first coverage area to a respective identifier of a coverage area of the second RAN. In such an example, by determining which one of the first coverage areas is the particular first coverage area that was indicated by the particular identifier of the first type, the base station may determine which distinguishing identifier corresponds to the determined coverage area. Later, the base station may send a handover request message to the base station that provides the determined coverage area based on the determined distinguishing identifier. For instance, where the distinguishing identifiers in the correlation data are IP addresses, the base station may determine the IP address of the determined coverage area and may then serve the mobile terminal by sending a handover request message to the IP address of the base station providing the determined coverage area.

Alternatively, serving the mobile terminal may involve updating a list of identifiers of the first type to disambiguate between the at least two of the first coverage areas that have the particular one of the identifiers of the first type. Such a list may be, for example, a neighbor list of first coverage areas or the list may be any of a number of lists that indicate first coverage areas which are typically maintained by various entities throughout the first RAN.

As a specific example of the handover process, consider a scenario where the mobile terminal 200 in FIG. 2 is being served by eNodeB 260 and sends a handover request that specifies PCI "1" as an indication of target coverage area 222. In that scenario, PCI conflict may arise, since both coverage area 222 and coverage area 246 have PCI "1". Thus, when eNodeB 260 receives this handover request from the UE, the eNodeB may determine that coverage areas 222 and 246 both have the reported PCI, and the eNodeB may responsively work to resolve the ambiguity.

To facilitate resolving the ambiguity, eNodeB 260 may request mobile terminal 200 to provide a report of air interface quality of the CDMA RAN, and the eNodeB may receive in response from the mobile terminal the requested report. Because coverage area 232 of the CDMA RAN, having PN offset "106" is co-located with coverage area 222 of the LTE RAN, and because the mobile terminal detected a strongest LTE signal from coverage area 222, the mobile terminal is likely to detect a strongest CDMA signal from coverage area 232. Consequently, the air interface quality report that the mobile terminal provides for the CDMA RAN is likely to specify PN offset "106".

Given this report of PN offset "106" from the mobile terminal, the eNodeB may then determine based on the report of PN offset "106" which LTE coverage area the mobile terminal detected as having PCI "1". To do this as discussed above, the eNodeB may refer to correlation data that maps each PN offset in the area to just one LTE coverage area in the area, such as to an IP address of the LTE coverage area that is co-located with the PN offset. Thus, the eNodeB may determine from such correlation data that the LTE coverage area indicated by the PCI "1" reported by the mobile terminal is coverage area 222.

Further, in some implementations, when the base station determines that at least two of the first coverage areas have the particular one of the identifiers of the first type, the base station may send a notification indicating this condition. In one instance, the base station sends the notification may via a network to another entity that facilitates assigning a new identifier to one or more of the two first coverage areas that have the particular one of the identifiers of the first type. At some point thereafter, the first RAN may assign a new identifier to one or more of the two first coverage areas which may thereby resolve the identifier conflict.

While, as described above, the base station generally receives (i) the specification of a particular one of the identifiers of the first type and (ii) the specification of a particular one of the identifiers of the second type separately, as discussed above, some example implementations of the method may involve receiving the two specifications together, such as in a single message or transmission. For instance, a mobile terminal may send such a combination at the request of the base station. From time to time, for example, the base station may determine that two first coverage areas have the same identifier and, accordingly, the identifier conflicts. In response, the base station may request the combination as one aspect of resolving the identifier conflict.

Figure 4:
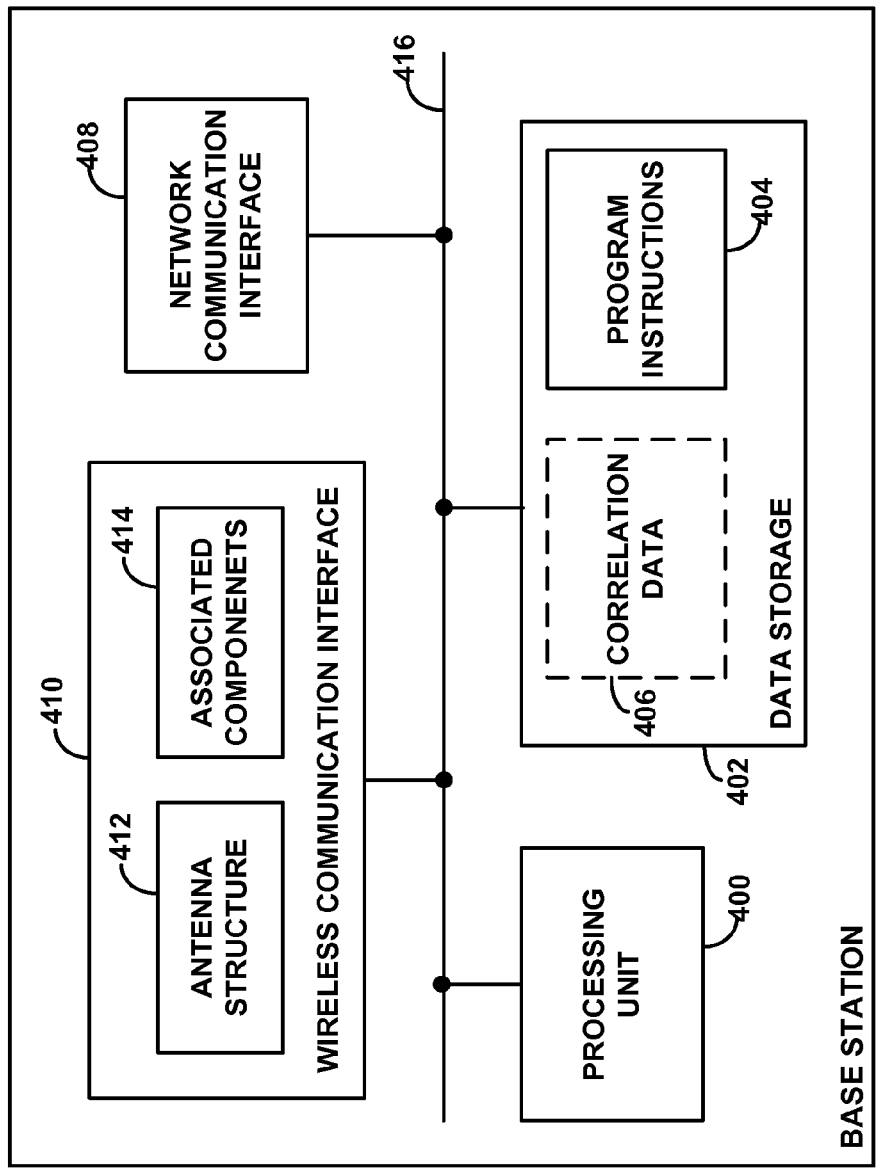
FIG. 4 is simplified block diagram of an example base station operable in accordance with the present method.

FIG. 4 is next a simplified block diagram of a base station, showing some of the components that may be included in the base station to facilitate implementation of the present method. By way of example, this figure could represent components of base station 120, 140, and/or 160 in FIG. 1. This figure could additionally represent one or more of eNodeB 220, 240, and/or 260 and/or BTS 230, 250, and/or 270 in FIG. 2 to carry out features such as those described above.

As shown in FIG. 4, the base station may include a processing unit 400, data storage 40, a network communication interface 408, and a wireless communication interface 410, all of which may be coupled together by a system bus, network or other connection mechanism 416. Although these components are shown as discrete blocks in the figure, they may be integrated together or distributed to various extents.

As shown, wireless communication interface 410 may comprise an antenna structure 412, which may be tower mounted, and associated components 414, for engaging in air interface communication with mobile terminals. Network communication interface 408 may then comprise an Ethernet or other module providing for connectivity through which to communicate with other base stations and/or with other components of the communication system. Processing unit 400 may then comprise one or more general purpose processors (e.g., microprocessors) and/or special-purpose processors (e.g., digital signal processors and/or application specific integrated circuits). And data storage 402 may comprise one or more volatile and/or non-volatile storage components.

As shown, data storage 402 may hold program instructions 404. The program instructions 404 may then be executable by the processing unit 400 to carry out various base station functions described herein. As such, the processing unit with these instructions may define a controller element of the base station, configured to carry out the described functions. For instance, where the controller is a component of an eNodeB, the controller may be configured to receive, via the antenna structure from a mobile terminal, (i) a handover request that specifies a particular PCI as an indication of a particular one of the LTE coverage areas detected by the mobile terminal and (ii) a specification of a particular PN offset as an indication of a particular one of the CDMA coverage areas detected by the mobile terminal, to determine which one of the LTE coverage areas is the particular LTE coverage area that was indicated by the particular PCI in the handover request, where the determination is based at least in part on the received specification of the particular PN offset, and to arrange for handover of the mobile terminal to the determined LTE coverage area based on the determining which one of the LTE coverage areas is the particular LTE coverage area that was indicated by the particular PCI in the handover request. Alternatively, some or all aspects of this controller element of the base station could be provided in a form other than a programmed processing unit.

Data storage 402 may optionally include correlation data 406, as shown. Correlation data 406 may include a mapping of each first coverage area to a respective identifier of a coverage area of the second RAN. The mappings in correlation data 406 may be updated periodically or upon the occurrence of an event, such as when an identifier of a coverage area in the second RAN is re-assigned or when a new coverage area is added to the first RAN. Typically, correlation data 406 includes a mapping for a subset of first coverage areas where the subset includes neighboring first coverage areas. However, correlation data 406 may include a mapping for all of the first coverage areas of the first RAN.

Exemplary embodiments have been described above. It should be understood, however, that variations from these embodiments are possible, while remaining within the true spirit and scope of the invention.

We claim:

1. In a system comprising a first radio access network (RAN) that is a Long Term Evolution (LTE) network and a second RAN that is a Code Division Multiple Access (CDMA) network, wherein the first RAN has first base stations that radiate to provide first coverage areas, wherein each first coverage area of the first RAN has an identifier of a first type that is a Physical Channel ID, wherein the second RAN has second base stations that radiate to provide second coverage areas, wherein each second coverage area of the second RAN has an identifier of the second type that is different from the first type and that is a pseudo-noise (PN) Offset, a method comprising:

receiving into a particular one of the first base stations of the first RAN, wirelessly from a mobile terminal, (i) a handover request that specifies a particular one of the identifiers of the first type as an indication of a particular one of the first coverage areas detected by the mobile terminal and (ii) a specification of a particular one of the identifiers of the second type as an indication of a particular one of the second coverage areas detected by the mobile terminal;

based at least in part on the received specification of the particular identifier of the second type, determining by the particular first base station which one of the first coverage areas is the particular first coverage area that was indicated by the particular identifier of the first type in the handover request; and based on the determining, arranging for handover of the mobile terminal to the determined coverage area.

2. The method of claim 1, further comprising:

in response to receiving the handover request, determining that at least two of the first coverage areas have the particular one of the identifiers of the first type.

3. The method of claim 2, wherein the determining by the particular first base station which one of the first coverage areas is the particular first coverage area that was indicated by the particular identifier of the first type in the handover request is responsive to the determining that at least two of the first coverage areas have the particular one of the identifiers of the first type.

4. The method of claim 2, further comprising:

in response to the determining that at least two of the first coverage areas have the particular one of the identifiers of the first type, requesting the mobile terminal to send a report of air-interface quality of the second RAN; and receiving the requested report of air-interface quality of the second RAN, wherein the requested report includes the specification of the particular one of the identifiers of the second type.

5. The method of claim 4, wherein the determining which one of the first coverage areas is the particular first coverage area that was indicated by the particular identifier of the first type in the handover request is based at least in part on the received report of air-interface quality of the second RAN.

6. The method of claim 2, further comprising:

in response to the determining that at least two of the first coverage areas have the particular one of the identifiers of the first type, sending a notification indicating that at least two of the first coverage areas have the particular one of identifiers of the first type.

7. The method of claim 1, further comprising:
for a subset of first coverage areas of the first RAN, receiving correlation data that maps each first coverage area in the subset to a respective identifier of a coverage area of the second RAN, wherein the determination by the particular first base station which one of the first coverage areas is the particular first coverage area that was indicated by the particular identifier of the first type in the handover request is based at least in part on the received correlation data.

8. The method of claim 1, wherein the handover request that specifies a particular one of the identifiers of the first type as an indication of a particular one of the first coverage areas detected by the mobile terminal includes the specification of the particular one of the identifiers of the second type as the indication of the particular one of the second coverage areas detected by the mobile terminal.

9. In a system comprising a first radio access network (RAN) that is a Long Term Evolution (LTE) network and a second RAN that is a Code Division Multiple Access (CDMA) network, wherein the first RAN has first base stations that radiate to provide first coverage areas, wherein each first coverage area of the first RAN has an identifier of a first type that is a Physical Channel ID, wherein the second RAN has second base stations that radiate to provide second coverage areas, wherein each second coverage area of the second RAN has an identifier of the second type that is different from the first type and that is a pseudo-noise (PN) Offset, a method comprising:
receiving into a particular one of the first base stations of the first RAN (i) a specification of a particular one of the identifiers of the first type as an indication of a particular one of the first coverage areas detected by a mobile terminal and (ii) a specification of a particular one of the identifiers of the second type as an indication of a particular one of the second coverage areas detected by the mobile terminal;
determining that at least two of the first coverage areas have the particular one of the identifiers of the first type;
in response to determining that at least two of the first coverage areas have the particular one of the identifiers of the first type, determining which one of the first coverage areas is the particular first coverage area that was indicated by the particular identifier of the first type, wherein determining which one of the first coverage areas is the particular first coverage area is based at least in part on the received specification of the particular identifier of the second type; and
serving the mobile terminal based on the determining which one of the first coverage areas is the particular first coverage area that was indicated by the particular identifier of the first type.

10. The method of claim 9, further comprising:
in response to the determining that at least two of the first coverage areas have the particular one of the identifiers of the first type, requesting the mobile terminal to send a report of air-interface quality of the second RAN; and
receiving the requested report of air-interface quality of the second RAN, wherein the requested report includes the specification of the particular one of the identifiers of the second type.

11. The method of claim 10, wherein the determining which one of the first coverage areas is the particular first coverage area that was indicated by the particular identifier of the first type in the handover request is based at least in part on the received report of air-interface quality of the second RAN.

12. The method of claim 9, further comprising:
in response to the determining that at least two of the first coverage areas have the particular one of the identifiers of the first type, sending a notification indicating that at least two of the first coverage areas have the particular one of identifiers of the first type.

13. The method of claim 9, wherein the first RAN comprises a data storage that has correlation data stored therein, wherein the correlation data, for a subset of first coverage areas of the first RAN, maps each first coverage area in the subset to a respective identifier of a coverage area of the second RAN, and wherein the determination by the particular first base station which one of the first coverage areas is the particular first coverage area that was indicated by the particular identifier of the first type in the handover request is based at least in part on the correlation data.

14. In a system comprising a Long-Term Evolution (LTE) radio access network (RAN) and a Code Division Multiple Access (CDMA RAN), wherein the LTE RAN has evolved Node Bs (eNodeB) that radiate to provide LTE coverage areas, wherein each LTE coverage area of the LTE RAN is identified by a Physical Channel ID (PCI), wherein the CDMA RAN has base stations that radiate to provide CDMA coverage areas, wherein each CDMA coverage area of the CDMA RAN is identified by a pseudo-noise (PN) offset, an eNodeB of the LTE RAN comprising:
an antenna structure configured to communicate over an air interface with Wireless Communication Devices (mobile terminals); and
a controller,
wherein the controller is configured to receive, via the antenna structure from a mobile terminal, (i) a handover request that specifies a particular PCI as an indication of a particular one of the LTE coverage areas detected by the mobile terminal and (ii) a specification of a particular PN offset as an indication of a particular one of the CDMA coverage areas detected by the mobile terminal,
wherein the controller is configured to determine which one of the LTE coverage areas is the particular LTE coverage area that was indicated by the particular PCI in the handover request, wherein the determination is based at least in part on the received specification of the particular PN offset, and
wherein the controller is configured to arrange for handover of the mobile terminal to the determined LTE coverage area based on the determining which one of the LTE coverage areas is the particular LTE coverage area that was indicated by the particular PCI in the handover request.

15. The eNodeB of claim 14, wherein the controller is configured to, in response to receiving the handover request, determine that at least two of the LTE coverage areas have the particular PCI.

16. The eNodeB of claim 15, wherein the controller is configured to, in response to the determination that at least two of the LTE coverage areas have the particular PCI, request the mobile terminal to send a report of air-interface quality of the CDMA RAN, and wherein the determination of which one of the LTE coverage areas is the particular LTE coverage area that was indicated by the particular PCI in the handover request is based at least in part on the requested report of air-interface quality.

17. The eNodeB of claim 15, wherein the controller is configured to, in response to the determination that at least two of the LTE coverage areas have the particular PCI, send a notification indicating that at least two of the LTE coverage areas have the particular PCI.

18. The eNodeB of claim 14, wherein the controller comprises a data storage, wherein correlation data is stored in the data storage, wherein the correlation data, for a subset of LTE coverage areas of the LTE RAN, maps each LTE coverage area in the subset to a respective PN Offset of a CDMA coverage area, and wherein the determination by the eNodeB which one of the LTE coverage areas is the particular LTE coverage area that was indicated by the particular PCI in the handover request is based at least in part on the correlation data.

* * * * *